(12) United States Patent
Chen et al.

(10) Patent No.: US 11,205,947 B2
(45) Date of Patent: Dec. 21, 2021

(54) MULTI-INPUT SINGLE-OUTPUT DC-DC CONVERTER, CONTROL CIRCUIT AND CONTROL METHOD THEREOF

(71) Applicant: Silergy Semiconductor Technology (Hangzhou) LTD, Hangzhou (CN)

(72) Inventors: Wei Chen, Saratoga, CA (US); Liangwei Sun, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 16/423,317

(22) Filed: May 28, 2019

(65) Prior Publication Data
US 2019/0379271 A1 Dec. 12, 2019

(30) Foreign Application Priority Data
Jun. 8, 2018 (CN) .......................... 201810587876.9

(51) Int. Cl.
*H02M 1/08* (2006.01)
*H02M 1/00* (2006.01)
*H02M 3/158* (2006.01)
*H02M 3/335* (2006.01)

(52) U.S. Cl.
CPC .......... *H02M 1/08* (2013.01); *H02M 3/1584* (2013.01); *H02M 3/33576* (2013.01); *H02M 1/0009* (2021.05); *H02M 1/0083* (2021.05)

(58) Field of Classification Search
CPC .. H02M 1/08; H02M 3/1584; H02M 3/33576; H02M 2001/0009; H02M 2001/0083; H02M 3/1586; H02M 3/1588
See application file for complete search history.

(56) References Cited

U.S. PATENT DOCUMENTS

| | | | |
|---|---|---|---|
| 6,459,171 B1* | 10/2002 | Leifer ...................... | H02J 1/10 307/24 |
| 6,549,432 B1* | 4/2003 | Giannopoulos ... | H02M 3/33561 363/21.14 |
| 7,227,277 B2 | 6/2007 | Chapman et al. | |
| 7,256,568 B2 | 8/2007 | Lam et al. | |
| 8,310,846 B2 | 11/2012 | Piazzesi | |
| 8,853,888 B2 | 10/2014 | Khaligh | |
| 9,130,460 B2 | 9/2015 | Sun et al. | |
| 9,257,916 B2 | 2/2016 | Cheng et al. | |
| 9,543,822 B2 | 1/2017 | Hang et al. | |
| 9,559,591 B2 | 1/2017 | Hang et al. | |
| 2007/0052397 A1* | 3/2007 | Thompson ............ | H02M 5/293 323/223 |
| 2008/0231115 A1 | 9/2008 | Cho et al. | |
| 2008/0258688 A1* | 10/2008 | Hussain .................. | H02J 7/045 320/145 |

(Continued)

*Primary Examiner* — Thienvu V Tran
*Assistant Examiner* — Bart Iliya

(57) ABSTRACT

A multi-input single-output DC-DC converter can include: a plurality of input circuits and an output circuit, where each input circuit includes a first switch, and one terminal of each of the input circuits is coupled to an input source, and the other terminal of the input circuit is coupled to the output circuit; and a control circuit configured to control operation periods of each input circuit in one switching period, in order to achieve power distribution and reach requirements for input currents of the input circuit and an output signal of the output circuit.

16 Claims, 7 Drawing Sheets

(56) References Cited

U.S. PATENT DOCUMENTS

| | | | |
|---|---|---|---|
| 2012/0049772 A1* | 3/2012 | Moussaoui | H02M 3/1588 |
| | | | 318/376 |
| 2012/0153729 A1 | 6/2012 | Song et al. | |
| 2013/0063180 A1 | 3/2013 | Sun et al. | |
| 2015/0078045 A1* | 3/2015 | Zhang | H02M 1/14 |
| | | | 363/64 |
| 2016/0211745 A1 | 7/2016 | Hang et al. | |
| 2017/0063238 A1 | 3/2017 | Hang et al. | |
| 2017/0279279 A1* | 9/2017 | Shimada | H02J 3/385 |
| 2018/0198361 A1* | 7/2018 | Seong | H02M 1/08 |
| 2019/0356227 A1* | 11/2019 | Davison | H02M 1/32 |

\* cited by examiner

MULTI-INPUT SINGLE-OUTPUT DC-DC CONVERTER, CONTROL CIRCUIT AND CONTROL METHOD THEREOF

RELATED APPLICATIONS

This application claims the benefit of Chinese Patent Application No. 201810587876.9, filed on Jun. 8, 2018, which is incorporated herein by reference in its entirety.

FIELD OF THE INVENTION

The present invention generally relates to the field of power electronics, and more particularly to multi-input single-output DC-DC converters, and associated control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
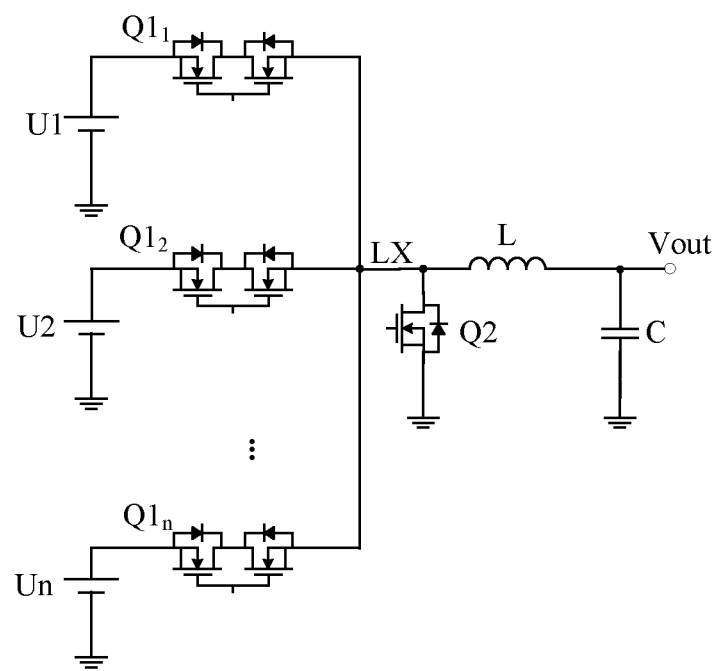
FIG. 1 is a schematic block diagram of a first example multi-input single-output DC-DC converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In recent years, new energy sources, such as solar energy, fuel cells, storage batteries, etc. have been widely developed and utilized for power generation. However, some single new energy supplies have problems of stability and discontinuity, so a variety of new energy may be needed to jointly supply power, in order to adapt to different environments and to meet different needs. However, each kind of new energy supply may be provided with a corresponding DC-DC converter, resulting in relatively large volume and complex system structures. In particular embodiments, a multi-input single-output converter can instead be utilized, in order to simplify the system structure and to reduce costs.

In one embodiment, a method of controlling a multi-input single-output DC-DC converter, can include: (i) providing the multi-input single-output DC-DC converter with a plurality of input circuits and an output circuit, where each input circuit includes a first switch, one terminal of each of the input circuits is coupled to an input source, and the other terminal of the input circuit is coupled to the output circuit; and (ii) controlling operation periods of each input circuit in one switching period, in order to achieve power distribution and reach requirements for input currents of the input circuits and for an output signal of the output circuit.

In one embodiment, a control circuit for a multi-input single-output DC-DC converter, where the multi-input single-output DC-DC converter includes a plurality of input circuits and an output circuit, where each input circuit includes a first switch, one terminal of each of the input circuits is coupled to an input source, and the other terminal of the input circuit is coupled to the output circuit, can include: (i) a current control circuit configured to respectively adjust input currents of each of the plurality of input circuits; (ii) a voltage control circuit configured to adjust an output voltage of the output circuit; and (iii) a logic control circuit coupled to the current control circuit and the voltage control circuit, and being configured to control operation periods of each input circuit in one switching period, in order to achieve power distribution and reach requirements for input currents of the input circuits and for an output signal of the output circuit.

In one embodiment, a multi-input single-output DC-DC converter can include: (i) a plurality of input circuits and an output circuit, where each input circuit includes a first switch, and one terminal of each of the input circuits is coupled to an input source, and the other terminal of the input circuit is coupled to the output circuit; and (ii) a control circuit configured to control operation periods of each input circuit in one switching period, in order to achieve power distribution and reach requirements for input currents of the input circuit and an output signal of the output circuit.

Referring now to FIG. 1, shown is a schematic block diagram of a first example multi-input single-output DC-DC converter, in accordance with embodiments of the present invention. In this particular example, the multi-input single-output DC-DC converter is a multi-input single-output buck converter including n input circuits coupled in parallel and an output circuit, where n is a positive integer. Each input circuit respectively includes one of input sources U1, U2, ..., Un and one of corresponding switches $Q1_1$, $Q1_2$, ..., $Q1_n$ coupled in series. Output terminals of the input circuits can connect to common node LX. In order to prevent direct short circuit between any two input sources, each "first" switch (e.g., $Q1_1$, $Q1_2$, ..., $Q1_n$) can apply a bidirectional switch including two switches. The two switches may both have one power terminal of the same kind coupled with each other, and control terminals of the two switches can be coupled together to receive the same drive signal. In this example, the two switches are N-type MOSFETs, the drain terminals of the two switches can connect with each other, and the gate terminals of the two switches can connect together. It should be understood that other types of controlled switches can also be used here. The output circuit can include switch Q2, coupled between common node LX and ground to provide a freewheeling path, and filter inductor L and filter capacitor C coupled in series between common node LX and ground.

Figure 2A:
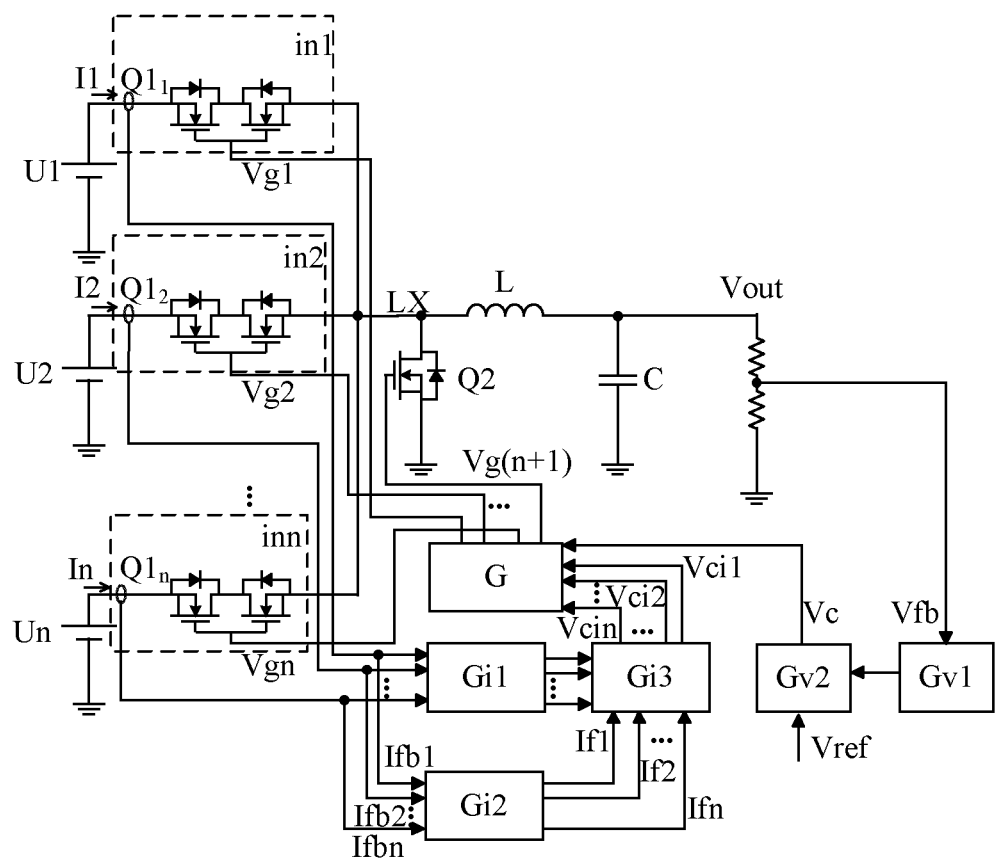
FIG. 2A is a schematic block diagram of an example control circuit of the first example multi-input single-output DC-DC converter, in accordance with embodiments of the present invention.

Referring now to FIG. 2A, shown is a schematic block diagram of an example control circuit of the first example multi-input single-output DC-DC converter, in accordance with embodiments of the present invention. In this particular example, the control circuit can include voltage control circuit Gv, current control circuit Gi, and logic control circuit G. Voltage control circuit Gv can include voltage sampling circuit Gv1 and voltage compensation circuit Gv2. Voltage sampling circuit Gv1 can sample output voltage Vout of the converter to obtain output voltage feedback signal Vfb. Voltage compensation circuit Gv2 can receive output voltage feedback signal Vfb and compare output voltage feedback signal Vfb against voltage reference signal Vref to generate voltage control signal Vc, thereby regulating output voltage Vout.

Current control circuit Gi can include current sampling circuit Gi1, current reference generating circuit Gi2, and current compensation circuit Gi3. Current sampling circuit Gi1 can sample the input currents of the n input circuits (see, e.g., boxed circuits in FIG. 2A) to obtain input current sampling signals Ifb1, Ifb2, ..., Ifbn. Current reference generating circuit Gi2 can generate current reference signals If1, If2, ..., Ifn. In one case, the current reference signals are preset values based on application requirements. In another case, current reference generating circuit Gi2 can receive the input current sampling signals, and may generate current reference signals If1, If2, ..., Ifn based on different requirements. Current compensation circuit Gi3 can generate current control signals Vci1, Vci2, ..., Vcin according to the input current sampling signals and the corresponding current reference signals respectively. Logic control circuit G can receive voltage control signal Vc and current control signals Vci1, Vci2, ..., Vcin, and may choose different control mode based on different operation modes to generate n+1 drive signals Vg1, Vg2, ..., Vg(n+1), thereby driving switches $Q1_1$, $Q1_2$, ..., $Q1_n$ and switch Q2.

In this example, current compensation circuit Gi3 can include N error amplifiers. A first input terminal of each error amplifier can receive a corresponding current reference signal, a second input terminal of each error amplifier can receive a corresponding input current sampling signal, and an output terminal can generate a corresponding current control signal. Voltage compensation circuit Gv2 can include an error amplifier having a first input terminal for receiving voltage reference signal Vref, a second input terminal for receiving output voltage feedback signal Vfb, and an output terminal for generating voltage control signal Vc. Also, logic control circuit G can include a selection circuit and a drive circuit. The selection circuit can include N selection units corresponding to n current control signals. Each selection unit can include a first and second input terminals for respectively receiving a corresponding one of the current control signals and voltage control signal Vc, and an output terminal for choosing the corresponding current control signal or voltage control signal Vc as control signal Vti (i=1, 2, ..., n). It should be understand that the voltage compensation circuit and current compensation circuit can include any suitable compensation circuit.

In this example, each selection unit can include first and second diodes. A cathode of the first diode may serve as the first input terminal of the selection unit, a cathode of the second diode may serve as the second input terminal of the selection unit, and anodes of the first and second diodes can be commonly connected as the output terminal of the selection unit to generate a corresponding control signal. When the input circuits transmit power to the output circuits one by one in one switching period based on the priority order, the drive circuit can apply control signals Vti (i=1, 2, ..., n) to generate drive signals for N switches $Q1_1$, $Q1_2$, ..., $Q1_n$ respectively based on the priority order, in order to adjust the duty cycles of the corresponding first switch. Further, the drive signal for switch Q2 can be generated by the drive circuit according to the switching sequence of n first switches and zero-crossing of the inductor current, or a constant turn-off time. When the input circuits can transmit power simultaneously to the output circuit in one switching period, the drive circuit can directly apply each of current control signals Vci1, Vci2, ..., Vcin and voltage control signal Vc to drive switches $Q1_1$, $Q1_2$, ..., $Q1_n$ and switch Q2.

Figure 2B:
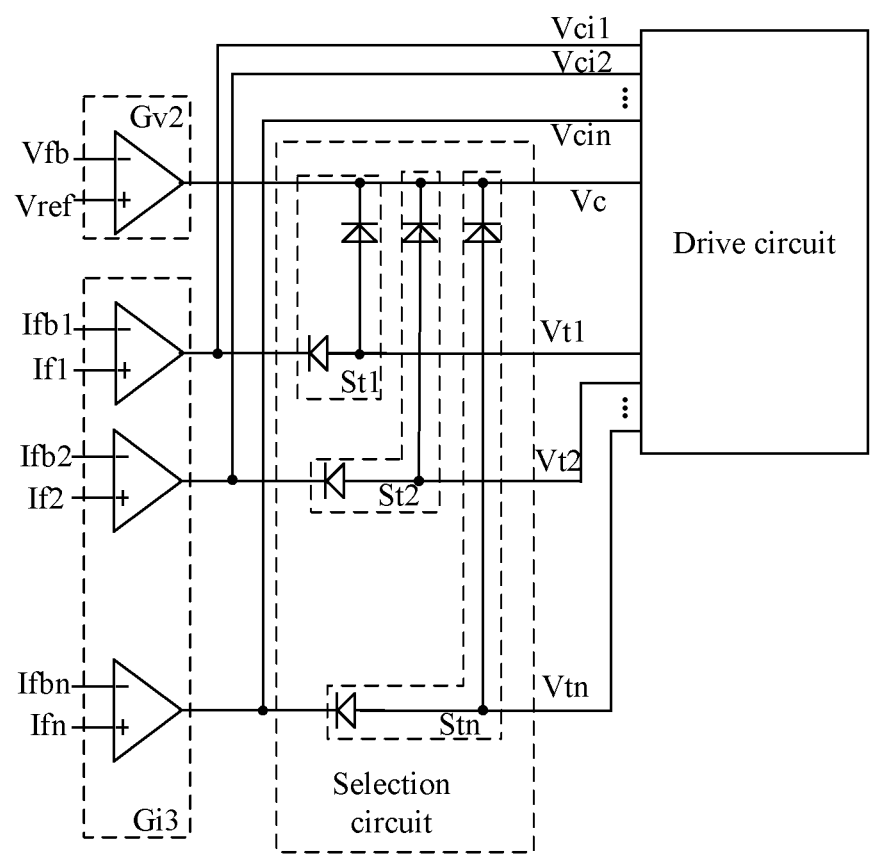
FIG. 2B is a schematic block diagram of an example selection circuit and unit of the example control circuit of the first example multi-input single-output DC-DC converter, in accordance with embodiments of the present invention.
Figure 3:
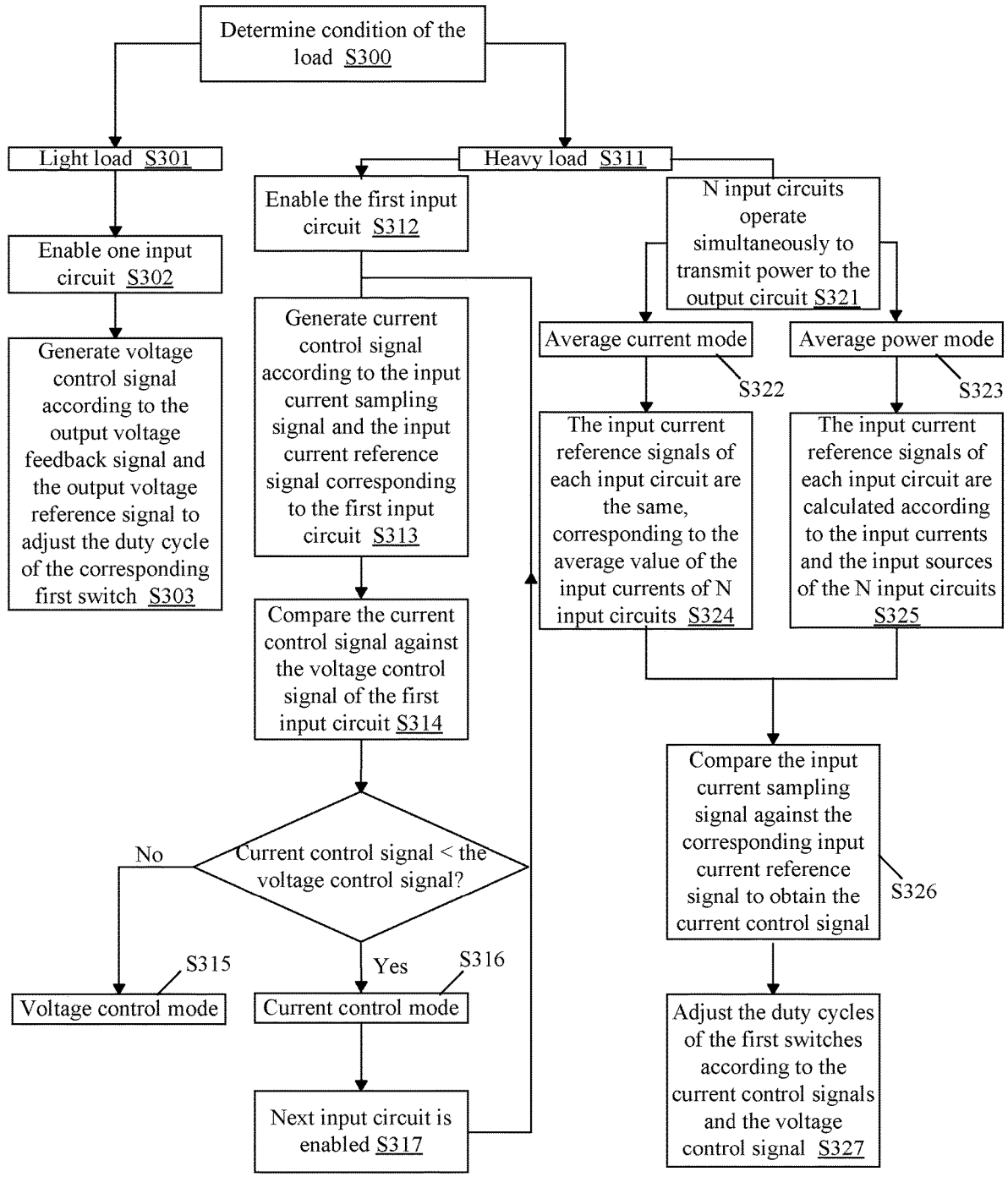
FIG. 3 is a flow diagram of an example control method of the first example multi-input single-output DC-DC converter, in accordance with embodiments of the present invention.

Referring now to FIG. 2B, shown is a schematic block diagram of an example selection circuit and unit of the example control circuit of the first example multi-input single-output DC-DC converter, in accordance with embodiments of the present invention. Referring also to FIG. 3, shown is a flow diagram of an example control method of the first example multi-input single-output DC-DC converter, in accordance with embodiments of the present invention. First, as shown in S300 of FIG. 3, the condition of the load can be determined. Then, the converter can operate in different operation modes based on different requirements. In S301, the load is light. Then in S302, one of the input circuits can be enabled. In S303, the voltage control signal may be generated according to the output voltage feedback signal and the output voltage reference signal, in order to adjust the duty cycle of the corresponding first switch. In S311, when the load is heavy, there are two operation modes. When the input circuits transmit power to the output circuit one by one in one switching period, the first input circuit is enabled, as shown in S312. Then, voltage compensation circuit Gv2 can generate voltage control signal Vc to maintain output voltage feedback signal Vfb at voltage reference signal Vref, and current compensation circuit Gi3 can compare input current sampling signal Ifb1 of the first input circuit against the corresponding current reference signal If1 to generate current control signal Vci1, as shown in S313.

Then in S314, current control signal Vci1 and voltage control signal Vc can be compared by the selection circuit (see, e.g., FIG. 2B). Under the light load, input current sampling signal Ifb1 may not reach current reference signal If1, and then voltage control signal Vc may be less than current control signal Vci1, such that voltage control signal Vc can be chosen by the first selection unit corresponding to the first input circuit as control signal Vt1 (see, e.g., FIG. 2B), and the drive circuit can adjust the duty cycle of switch $Q1_1$ based on control signal Vt1, in order to maintain output voltage feedback signal Vfb at voltage reference signal Vref, which may indicate that the first input circuit operates in a voltage control mode, as shown in S315. Since only one of the N input circuits (see, e.g., boxed circuits in FIG. 2A) may be enabled at a time, this operation mode is the single-input single-output operation mode. The first input circuit that is enabled can form a single-input single-output buck converter together with shared circuit portions switch Q2, filter inductor L, and filter capacitor C. In addition, the priority order of the N input circuits to be enabled can be set in advance according to the actual application, thereby reducing the power consumption of the converter.

In S316 when the load gradually becomes heavy, input current I1 of the first input circuit may increase. When current control signal Vci1 is less than voltage control signal Vc (e.g., input sampling current Ifb1 of the first input circuit reaches corresponding current reference signal If1), current control signal Vci1 can be selected by the first selection unit (see, e.g., FIG. 2B) as control signal Vt1, and the drive circuit can adjust the duty cycle of switch $Q1_1$ based on control signal Vt1, in order to maintain input current sampling signal Ifb1 at current reference signal If1, which may indicate that the first input circuit operates in a current control mode. In S317, if the load continues to be heavier, output voltage feedback signal Vfb may be less than voltage reference signal Vref, and then a second input circuit may automatically be enabled. This refers to multi-input single-output operation mode. At this time, current compensation circuit Gi3 may activate current control signal Vci2. By comparing current control signal Vci2 against voltage control signal Vc, the second input circuit can be controlled to change to the voltage control mode or the current control mode. And so on, until current control signal Vcim is greater than voltage control signal Vc (e.g., input current sampling signal Ifbm of the Mth input circuit is less than corresponding current reference signal Ifm), and output voltage Vout can be maintained at voltage reference signal Vref. In this example, m is a positive integer and 1≤m≤n.

It should be understand that, when m=n, and input current sampling signal Ifbn can reach current reference signal Ifn; that is, the converter is full-loaded. If the load further increases, the output voltage Vout may be out of control, and thus the converter should be shut down. In addition, a dead zone can be inserted before switch Q1 that is enabled is turned on, thereby avoiding a short circuit caused by simultaneous conduction of the first switches in two input circuits. In this example, during each switching period, switch Q2 can be turned on after switch Q1 of the mth input circuit is turned off, and may be turned off before the switching period ends.

In S321, when the n input circuits can be controlled to transmit power to the output circuit simultaneously, the average distribution of the input current or the input power of the n input circuits may be achieved. This operation mode also refers to multi-input single-output mode. There are two different modes for the multi-input single-output mode: average current mode (in S322) and average power mode (in S323). Under the average current mode, as shown in S324, the current reference signals of each input circuit may be equal to a value that corresponds to an average value of the input currents of the n input circuits. The value can be calculated by current reference generating circuit Gi2 according to the n input current sampling signals. Under the average power mode, as shown in S325, the n current reference signals can respectively be calculated by current reference generating circuit Gi2 according to the n input current sampling signals and the n input sources, such that the input power of each input circuit can be the same.

Whether in the average current mode or in the average power mode, in S326, current compensation circuit Gi3 can respectively generate current control signals Vci1, Vci2, . . . , Vcin according to the input current sampling signal and the current reference signal of each input circuit. Voltage compensation circuit Gv2 can respectively generate voltage control signal Vc according to output voltage feedback signal Vfb and voltage reference signal Vref. In S327, the drive circuit can directly receive n current control signals and voltage control signal Vc to generate the drive signals, such that the duty cycles of switches $Q1_1, Q1_2, \ldots, Q1_n$ can be adjusted to maintain output voltage Vout to be equal to voltage reference signal Vref.

In this particular example, current control signals Vci1, Vci2, . . . , Vci(n−1) can be used to adjust the duty cycle of corresponding switches $Q1_1, Q1_2, \ldots, Q1_{n-1}$, and voltage control signal Vc can be used to adjust the duty cycle of switch $Q1_n$. That is, in order to maintain the output voltage, current control signal Vcin may not be used to adjust the duty cycle of switch $Q1_n$, and if the output voltage is not need to be controlled, the current control signal Vcin may be used to adjust the duty cycle of switch $Q1_n$ instead of voltage control signal Vc. In addition, the conduction periods of the switches in every two input circuits cannot be coincident with each other during each switching period. That is, the next switch $Q1_n$ can be turned on until the previous switch $Q1_n$ is turned off, and switch Q2 can be turned on until switch $Q1_n$ is turned off and is turned on when the inductor current freewheels to zero. At this time, one switching period ends. The dead zone can be inserted before the next switch is turned on and after previous switch is turned off, in order to prevent the two switches from conducting at the same time.

Figure 4:
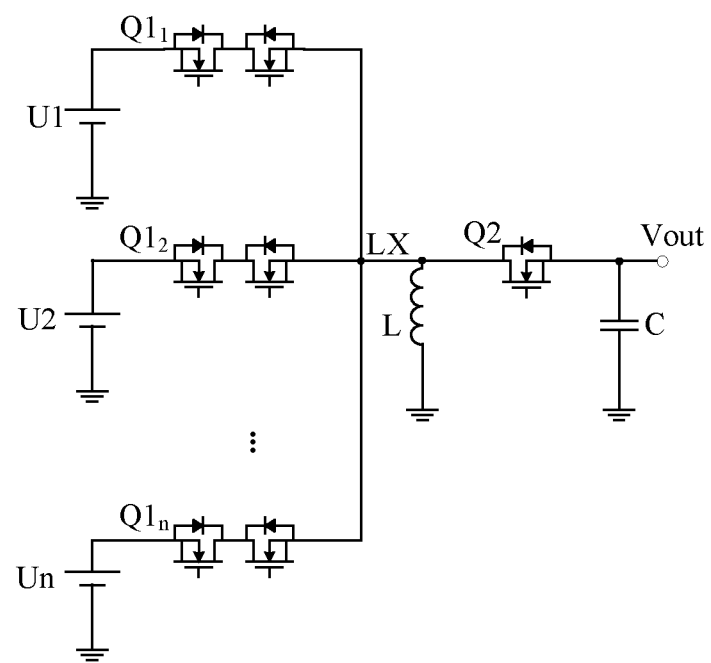
FIG. 4 is a schematic block diagram of a second example multi-input single-output DC-DC converter, in accordance with embodiments of the present invention.

Referring now to FIG. 4, shown is a schematic block diagram of a second example multi-input single-output DC-DC converter, in accordance with embodiments of the present invention. In this particular example, the multi-input single-output DC-DC converter is a multi-input single-output buck-boost converter. Here, the position of switch Q2 and filter inductor L of the output circuit of the multi-input single-output buck-boost converter are exchanged as compared to previous examples.

Figure 5:
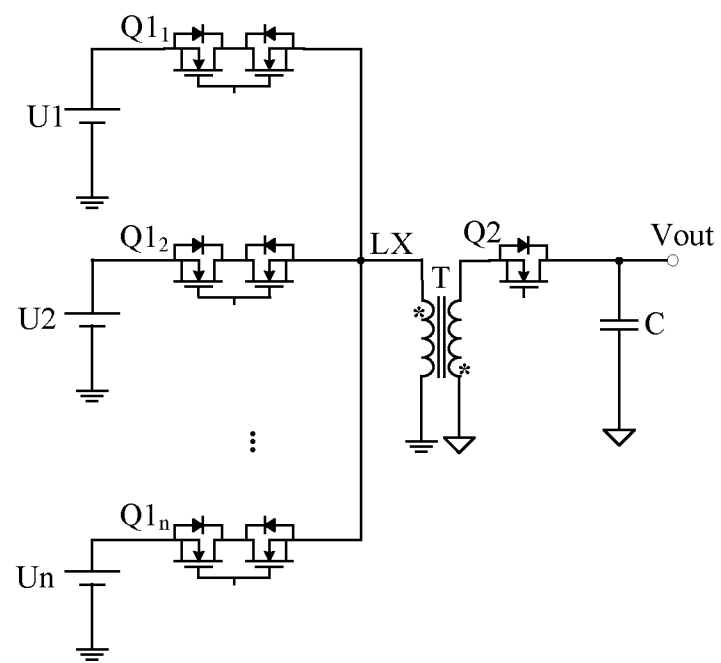
FIG. 5 is a schematic block diagram of a third example multi-input single-output DC-DC converter, in accordance with embodiments of the present invention.

Referring now to FIG. 5, shown is a schematic block diagram of a third example multi-input single-output DC-DC converter, in accordance with embodiments of the present invention. In this particular example, the multi-input single-output DC-DC converter is a multi-input single-output flyback converter. Here, the output circuit of the multi-input single-output flyback converter can include transformer T, switch Q2, and filter capacitor C. The primary winding of transformer T can be coupled in parallel between common node LX of the n input circuits and the ground, and the secondary winding can be coupled in series with switch Q2. Also, switch Q2 can be coupled in series with filter capacitor C. Further, the control method of the multi-input single-output flyback converter is similar to that of the multi-input single-output buck converter, as discussed above.

Figure 6:
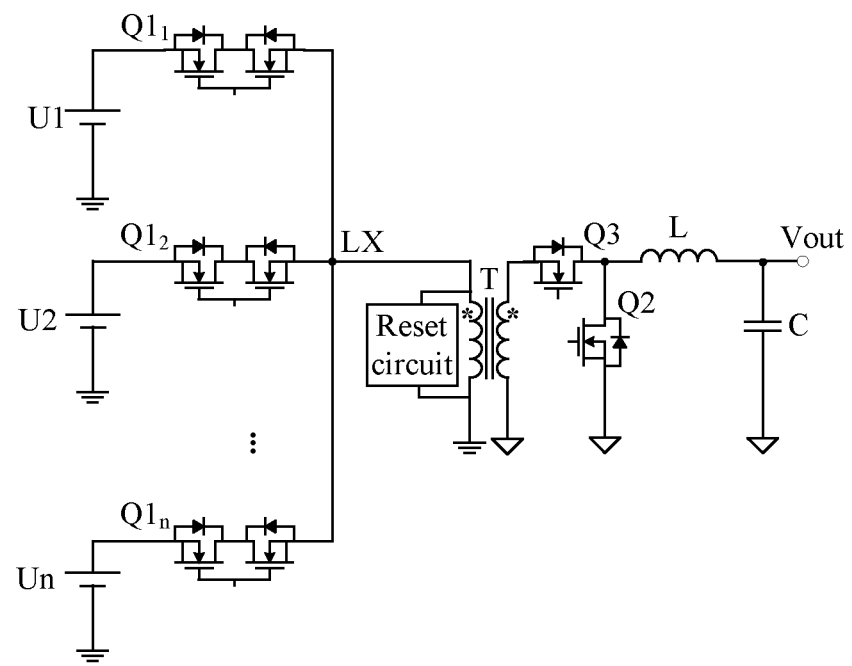
FIG. 6 is a schematic block diagram of a fourth example multi-input single-output DC-DC converter, in accordance with embodiments of the present invention.

Referring now to FIG. 6, shown is a schematic block diagram of a fourth example multi-input single-output DC-DC converter, in accordance with embodiments of the present invention. In this particular example, the multi-input single-output DC-DC converter is a multi-input single-output forward converter. Here, the output circuit of the multi-input single-output forward converter can include transformer T, switch Q2, switch Q3, filter inductor L, and filter capacitor C. The primary winding of transformer T can be coupled in parallel between common node LX of the n input circuits and ground, and may be coupled in parallel with a reset circuit. The secondary winding of transformer T can be coupled in series with switch Q3, and then coupled in parallel with switch Q2. Filter inductor L and filter capacitor C can be coupled in series between a common terminal of switches Q2 and Q3 and ground. In this particular example, any circuit form of the reset circuit can be utilized to realize the reset function.

In particular embodiments, a plurality of input circuits of the converter can transmit power to the output circuit one by one, or can transmit power to the output circuit simultaneously, by controlling operation periods of each input circuit according to different environments and application requirements. When the plurality of input circuits transmit power to the output circuit simultaneously, the input current or the input power can be equally distributed. Thus, by utilizing control method of particular embodiments, the flexibility and adaptability of the overall system can be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a multi-input single-output DC-DC converter, the method comprising:
    a) providing said multi-input single-output DC-DC converter with a plurality of input circuits and an output circuit, wherein each input circuit comprises a first switch, one terminal of each of said input circuits is coupled to an input source, and the other terminal of said input circuit is coupled to said output circuit;
    b) controlling operation periods of each input circuit and said output circuit in one switching period;
    c) wherein said output circuit comprises a second switch that is controlled to operate after all of said plurality of input circuits that have been enabled for operation have operated in one switching period until a current flowing through an inductor of said multi-input single-output DC-DC converter reaches zero; and
    d) comparing a current control signal for maintaining an input current of a corresponding input circuit as constant with a voltage control signal for maintaining an output voltage of said output circuit as constant, to select one of said current control signal and said voltage control signal for controlling said first switch in said corresponding input circuit.

2. The method of claim 1, further comprising:
    a) controlling said input circuits to transmit power to said output circuit one by one in one switching period; and
    b) when an input current of a corresponding input circuit reaches a preset value, putting a following input circuit into operation.

3. The method of claim 1, further comprising:
    a) generating a plurality of current control signals corresponding to each input circuit, in accordance with a plurality of current reference signals and a plurality of input current sampling signals for characterizing input currents of each of said plurality of input circuits; and
    b) generating said voltage control signal in accordance with a voltage reference signal and an output voltage feedback signal for characterizing said output voltage of said output circuit.

4. The method of claim 3, further comprising generating drive signals based on a control signal generated by respectively comparing each of said plurality of current control signals with said voltage control signal.

5. The method of claim 3, further comprising generating drive signals based on said plurality of current control signals and said voltage control signal respectively.

6. A control circuit for a multi-input single-output DC-DC converter, wherein said multi-input single-output DC-DC converter comprises a plurality of input circuits and an output circuit, wherein each input circuit comprises a first switch, one terminal of each of said input circuits is coupled to an input source, and the other terminal of said input circuit is coupled to said output circuit, wherein the control circuit comprises:
    a) a current control circuit configured to respectively adjust input currents of each of said plurality of input circuits;
    b) a voltage control circuit configured to adjust an output voltage of said output circuit;
    c) a logic control circuit coupled to said current control circuit and said voltage control circuit, and being configured to control operation periods of each input circuit and said output circuit in one switching period;
    d) wherein said output circuit comprises a second switch that is controlled to operate after all of said plurality of input circuits that have been enabled for operation have operated in one switching period until a current flowing through an inductor of said multi-input single-output DC-DC converter reaches zero; and
    e) wherein by comparing a current control signal for maintaining an input current of a corresponding input circuit as constant with a voltage control signal for maintaining said output voltage of said output circuit as constant, one of said current control signal and said voltage control signal is selected for controlling said first switch in said corresponding input circuit.

7. The control circuit of claim 6, wherein said current control circuit comprises:
    a) a current sampling circuit configured to sample said input currents of each of said plurality of input circuits correspondingly, and to generate a plurality of input current sampling signals;
    b) a current reference generating circuit configured to generate a plurality of current reference signals; and
    c) a current compensation circuit configured to generate a plurality of current control signals for each input circuit according to said plurality of input current sampling signals and said plurality of current reference signals respectively.

8. The control circuit of claim 6, wherein said voltage control circuit comprises:
    a) a voltage sampling circuit configured to sample said output voltage of said output circuit, and generate an output voltage feedback signal; and
    b) a voltage compensation circuit configured to generate said voltage control signal according to said output voltage feedback signal and a voltage reference signal.

9. The control circuit of claim 6, wherein said logic control circuit comprises a drive circuit configured to generate drive signals for controlling said first switches in each of said plurality of input circuits.

10. The control circuit of claim 9, wherein said logic control circuit further comprises a selection circuit configured to generate a plurality of control signals by respectively comparing each current control signal generated by said current control circuit and said voltage control signal generated by said voltage control circuit, wherein said drive circuit receives said control signals to respectively control said first switches in said input circuits.

11. The control circuit of claim 10, wherein said selection circuit comprises a plurality of selection units, each of which comprises a first input terminal to receive each of said current control signals respectively, a second input terminal to receive said voltage control signal, and an output terminal to select said current control signal or said voltage control signal as said control signal.

12. The control circuit of claim 9, wherein said drive circuit receives current control signals generated by said current control circuit and said voltage control signal generated by said voltage control circuit, in order to respectively control said first switches in said input circuits.

13. A multi-input single-output DC-DC converter, comprising:
   a) a plurality of input circuits and an output circuit, wherein each input circuit comprises a first switch, and one terminal of each of said input circuits is coupled to an input source, and the other terminal of said input circuit is coupled to said output circuit, wherein said first switch is bidirectional and comprises two transistors having a same kind of power terminal thereof connected together in order to prevent a short circuit between input sources;
   b) a control circuit configured to control operation periods of each input circuit and said output circuit in one switching period;
   c) wherein said output circuit comprises a second switch that is controlled to operate after all of said plurality of input circuits that have been enabled for operation have operated in one switching period until a current flowing through an inductor of said multi-input single-output DC-DC converter reaches zero; and
   d) wherein by comparing a current control signal for maintaining an input current of a corresponding input circuit as constant with a voltage control signal for maintaining an output voltage of said output circuit as constant, one of said current control signal and said voltage control signal is selected for controlling said first switch in said corresponding input circuit.

14. The converter of claim 13, wherein said output circuit comprises an inductive component, and is configured to form a switching power stage circuit together with each of said input circuits.

15. The converter of claim 13, wherein each of said two transistors has a control terminal thereof coupled together.

16. The converter of claim 13, wherein said converter is any one of buck, buck-boost, flyback or forward converter.

* * * * *